United States Patent
Meng et al.

(10) Patent No.: US 11,156,890 B2
(45) Date of Patent: Oct. 26, 2021

(54) DISPLAY DEVICE AND METHOD FOR CONTROLLING DISPLAY DEVICE

(71) Applicant: BOE TECHNOLOGY GROUP CO., LTD., Beijing (CN)

(72) Inventors: Xiandong Meng, Beijing (CN); Wei Wang, Beijing (CN); Jifeng Tan, Beijing (CN); Xianqin Meng, Beijing (CN); Fangzhou Wang, Beijing (CN); Qiuyu Ling, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 28 days.

(21) Appl. No.: 16/642,629

(22) PCT Filed: Mar. 29, 2019

(86) PCT No.: PCT/CN2019/080387
§ 371 (c)(1),
(2) Date: Feb. 27, 2020

(87) PCT Pub. No.: WO2020/198923
PCT Pub. Date: Oct. 8, 2020

(65) Prior Publication Data
US 2021/0149229 A1 May 20, 2021

(51) Int. Cl.
*G02F 1/139* (2006.01)
*G02F 1/1335* (2006.01)
(Continued)

(52) U.S. Cl.
CPC ........... *G02F 1/139* (2013.01); *G02B 6/0023* (2013.01); *G02B 6/0026* (2013.01); *G02F 1/13706* (2021.01); *G02F 1/133504* (2013.01); *G02F 1/133514* (2013.01); *G02F 1/133565* (2021.01); *G02F 1/133617* (2013.01);
(Continued)

(58) Field of Classification Search
CPC ........... G02F 1/133555; G02F 2203/09; G02F 1/1347; G02F 2203/07; G02F 2202/36; G02F 2203/24; G02F 2203/30; G02F 1/133504; G02F 1/133514; G02F 1/13706; G02F 1/133565; G02F 1/133617;
(Continued)

(56) References Cited

U.S. PATENT DOCUMENTS

2018/0284469 A1 * 10/2018 Koito ................ G02F 1/133536
2019/0025644 A1 * 1/2019 Tan ........................ G02F 1/1343

* cited by examiner

*Primary Examiner* — Mariam Qureshi
(74) *Attorney, Agent, or Firm* — Armstrong Teasdale LLP (57) ABSTRACT

A display device and a method for controlling the display device are disclosed. The display device includes a backlight module and a liquid crystal cell on a light emitting side of the backlight module. The liquid crystal cell includes a first electrode, a second electrode disposed in a first direction opposite to the first electrode, a liquid crystal layer between the first electrode and the second electrode, and a diffractive optical element in the liquid crystal layer. A refractive index of the diffractive optical element is equal to a short-axis refractive index of a liquid crystal in the liquid crystal layer. The liquid crystal cell is divided into a first portion where the liquid crystal molecules are capable of rotating in a first plane and a second portion in a second direction perpendicular to the first direction where liquid crystal molecules are capable of rotating in a first plane.

20 Claims, 3 Drawing Sheets

(51) Int. Cl.
    *F21V 8/00*          (2006.01)
    *G02F 1/1337*      (2006.01)
    *G02F 1/13357*     (2006.01)
    *G02F 1/137*       (2006.01)
    *G02F 1/1343*      (2006.01)

(52) U.S. Cl.
    CPC .. *G02F 1/133742* (2021.01); *G02F 1/134309*
          (2013.01); *G02F 1/133531* (2021.01); *G02F*
          *2202/36* (2013.01); *G02F 2203/07* (2013.01);
              *G02F 2203/24* (2013.01); *G02F 2203/30*
                                    (2013.01)

(58) Field of Classification Search
    CPC ............ G02F 1/139; G09G 2300/0456; G02B
                                               6/0023; G02B 6/0026
    See application file for complete search history.

| Control an electric field between the first electrode and the second electrode of the first portion so as to rotate in a first plane the liquid crystal molecules of the first portion, so that the diffractive optical element diffracts a first polarized component of light propagating in the light guide plate of the backlight module out of the light guide plate | S901 |

| Control an electric field between the first electrode and the second electrode of the second portion so as to rotate in a second plane the liquid crystal molecules of the second portion, so that the diffractive optical element diffracts a second polarized component of light propagating in the light guide plate of the backlight module out of the light guide plate | S902 |

FIG. 8

DISPLAY DEVICE AND METHOD FOR CONTROLLING DISPLAY DEVICE

CROSS REFERENCE TO RELATED APPLICATIONS

This patent application is a National Stage Entry of PCT/CN2019/080387 filed on Mar. 29, 2019, the disclosure of which is incorporated by reference herein in its entirety as part of the present application.

BACKGROUND

Embodiments of the present disclosure relate to a field of display technology, and in particular, to a display device and a method for controlling the display device.

A liquid crystal display device is a mainstream type of flat panel display (FPD). Because of its small size, low power consumption, no radiation, and relatively low production costs, liquid crystal display device is increasingly used in the field of high-performance displays.

The liquid crystal display device includes a first substrate (an array substrate), a second substrate (a color filter substrate), and a liquid crystal layer disposed between the first substrate and the second substrate. An upper polarizer is provided on the second substrate, and a lower polarizer is provided on the first substrate. The rotation of the liquid crystal may be controlled using a voltage to control the amount of light transmitted through the upper polarizer, thereby achieving grayscale display.

BRIEF DESCRIPTION

Embodiments of the present disclosure provide a display device and a method for controlling the display device.

An aspect of the present disclosure provides a display device including a backlight module and a liquid crystal cell located on a light emitting side of the backlight module. The liquid crystal cell includes a first electrode, a second electrode disposed in a first direction opposite to the first electrode, a liquid crystal layer between the first electrode and the second electrode, and a diffractive optical element in the liquid crystal layer. A refractive index of the diffractive optical element is equal to a short-axis refractive index of a liquid crystal in the liquid crystal layer. The liquid crystal cell is divided into a first portion and a second portion in a second direction perpendicular to the first direction. Liquid crystal molecules of the first portion are capable of rotating in a first plane. Liquid crystal molecules of the second portion are capable of rotating in a second plane perpendicular to the first plane.

In some exemplary embodiments of the present disclosure, the liquid crystal molecules of the first portion have a first initial orientation, and the liquid crystal molecules of the second portion have a second initial orientation. The first initial orientation and the second initial orientation are perpendicular to each other and both parallel to a third plane perpendicular to the first and second planes.

In some exemplary embodiments of the present disclosure, the liquid crystal layer includes a positive liquid crystal.

In some exemplary embodiments of the present disclosure, a difference between a long-axis refractive index and a short-axis refractive index of the liquid crystal in the liquid crystal layer is between 1.522 and 1.822.

In some exemplary embodiments of the present disclosure, the diffractive optical element includes a multi-step grating.

In some exemplary embodiments of the present disclosure, the liquid crystal cell further includes a first alignment layer on a side of the first electrode facing towards the liquid crystal layer and a second alignment layer on a side of the second electrode facing towards the liquid crystal layer. An orientation of the first alignment layer is perpendicular to an orientation of the second alignment layer.

In some exemplary embodiments of the present disclosure, the backlight module includes a light guide plate having a light emergent surface and a bottom surface opposite to the light emergent surface, a light source located at an end of the light guide plate and on a side of the bottom surface of the light guide plate, a collimating optical component located between the bottom surface of the light guide plate and the light source, and a coupling grating located on the light emergent surface of the light guide plate and facing towards the collimating optical component.

In some exemplary embodiments of the present disclosure, the light source includes at least one of a monochrome LED light source, a monochrome OLED light source, or a monochrome laser light source.

In some exemplary embodiments of the present disclosure, the collimating optical element includes at least one of a collimating lens or a free-form curved mirror.

In some exemplary embodiments of the present disclosure, the coupling grating includes at least one of a tilted grating, a holographic Bragg grating, and a step grating.

In some exemplary embodiments of the present disclosure, the display device further includes a color filter layer on a side of the second electrode away from the liquid crystal layer.

In some exemplary embodiments of the present disclosure, the color filter layer includes a quantum dot.

In exemplary embodiments of the present disclosure, the display device further includes a control element. The control element is configured to control an electric field between the first electrode and the second electrode of the first portion so as to rotate in the first plane the liquid crystal molecules of the first portion, so that the diffractive optical element diffracts a first polarized component of light propagating in the light guide plate of the backlight module out of the light guide plate. The control element is further configured to control the electric field between the first electrode and the second electrode of the second portion so as to rotate in the second plane the liquid crystal molecules of the second portion, so that the diffractive optical element diffracts a second polarized component of light propagating in the light guide plate of the backlight module out of the light guide plate. In some embodiments of the present disclosure, a polarization direction of the first polarized component is parallel to the first plane, and a polarization direction of the second polarized component is parallel to the second plane.

In some exemplary embodiments of the present disclosure, the diffractive optical element is configured such that, in a case where the first polarized component is diffracted out of the light guide plate, a portion of the light guide plate corresponding to the second portion transmits only the second polarized component.

Another aspect of the present disclosure provides a method for controlling a display device of one or more embodiments of the present disclosure. The method includes controlling an electric field between the first electrode and the second electrodes of the first portion so as to rotate in the first plane the liquid crystal molecules of the first portion, so that the diffractive optical element diffracts a first polarized component of light propagating in the light guide plate of the backlight module out of the light guide plate, wherein a polarization direction of the first polarized component is parallel to the first plane, and controlling an electric field between the first electrode and the second electrodes of the second portion so as to rotate in the second plane the liquid crystal molecules of the second portion, so that the diffractive optical element diffracts a second polarized component of light propagating through the light guide plate of the backlight module out of the light guide plate, wherein a polarization direction of the second polarized component is parallel to the second plane.

In some exemplary embodiments of the present disclosure, the method further includes transmitting only the second polarized component by a portion of the light guide plate corresponding to the second portion, in a case where the first polarized component is diffracted out of the light guide plate.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present application, wherein.

Corresponding reference numerals indicate corresponding parts or features throughout the several views of the drawings.

DETAILED DESCRIPTION

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

As used herein, the expressions "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case in which, besides B, no other components, constituents, or elements are present in A.

In addition, when introducing elements of the present application and their embodiments, the articles "a", "an", "the" and "said" are intended to mean that there are one or more elements. Unless otherwise stated, "a plurality of" means two or more elements. The terms "comprising", "including", "containing" and "having" are intended to be inclusive and mean that there may be additional elements other than the listed elements. The terms "first", "second", "third", etc. are used for descriptive purposes only, and cannot be understood to indicate or imply relative importance and order of formation.

In a related display device, in order to realize a normal grayscale display, it is necessary to arrange polarizers whose transmission axis directions are perpendicular to each other on both sides of the liquid crystal cell of the display device, and the amount of light transmitted through the upper polarizer is controlled by controlling the rotation of a liquid crystal through voltage. In this configuration, only light with a polarization component whose polarization direction is parallel to the transmission axis of the lower polarizer may pass through the lower polarizer. Therefore, at most half of the natural light emitted from the backlight module may enter the liquid crystal layer and be used by a display panel. Therefore, such display devices generally have a problem of low light utilization rate, which generally does not exceed 50%.

In some embodiments of the present disclosure, a display device and a control method for the display device capable of improving light utilization efficiency are provided.

Here, for convenience in explaining the embodiments of the present disclosure, the following terms are defined.

Term "birefringence phenomenon" refers to a phenomenon that when a light beam is incident into an anisotropic medium (such as a liquid crystal), it is divided into two beams with different propagation directions after being refracted on the interface. Of these two beams, one is ordinary light (o-light) and the other is extraordinary light (e-light). The Liquid crystal has different refractive indexes for ordinary light and extraordinary light.

Term "short-axis refractive index $n_o$ of the liquid crystal" refers to the refractive index of the liquid crystal for ordinary light (o-light) in the case where light undergoes a birefringence phenomenon in the liquid crystal, which usually has a constant value.

Term "long-axis refractive index $n_e$ of liquid crystal" refers to the refractive index of the liquid crystal for e-light when extraordinary light (e-light) propagates in a direction perpendicular to the optical axis in the case where light undergoes a birefringence phenomenon in the liquid crystal. For a positive liquid crystal, the long-axis refractive index $n_e$ of the liquid crystal is greater than the short-axis refractive index $n_o$ of the liquid crystal. The refractive index of the liquid crystal for e-light changes as an angle between the propagation direction of the e-light and the long axis of the liquid crystal changes.

Term "optical axis" refers to a direction in which the propagation direction and velocity of o-light and e-light are the same in a propagation medium (such as a liquid crystal). That is, when light propagates in the direction of the optical axis, no birefringence occurs. For a positive liquid crystal, the long axis direction of the liquid crystal molecules is the optical axis direction.

Term "main plane of o-light" refers to a plane containing the optical axis and the o-light, and the vibration direction of o-light is perpendicular to its own main plane. Term "main plane of e-light" refers to a plane containing the optical axis and the e-light, and the polarization direction of e-light is parallel to its own main plane.

In some embodiments of the present disclosure, light incident on the liquid crystal layer from other media may be birefringent. However, in a case where the liquid crystal layer is generally thin, it is difficult to separate o-light and e-light. Therefore, in some embodiments of the present disclosure, the propagation directions of o-light and e-light in the liquid crystal layer may be regarded as approximately the same. In this case, it may be considered that the main planes of o-light and e-light in the liquid crystal layer are substantially coincident.

In an aspect of the present disclosure, there is provided a display device that does not require a polarizer. Therefore, light utilization efficiency may be greatly improved.

Figure 1:
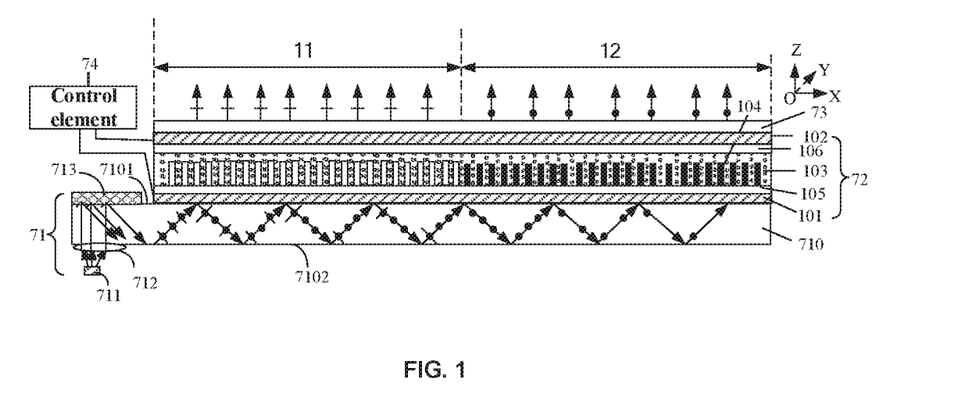
FIG. 1 is a schematic view of a display device according to some embodiments of the present disclosure.

FIG. 1 is a schematic view of a display device in some embodiments of the present disclosure. The display device may include a backlight module 71 and a liquid crystal cell 72 located on a light emitting side of the backlight module 71.

In some embodiments of the present disclosure, as shown in FIG. 1, the backlight module 71 may include a light guide plate 710 having a light emergent surface 7101 and a bottom surface 7102 opposite to the light emergent surface 7101, a light source 711 located at an end of the light guide plate 710 and on a side of the bottom surface 7102 of the light guide plate 710, a collimating optical component 712 located between the bottom surface 7102 of the light guide plate 710 and the light source 711, and a coupling grating 713 located on light emergent surface 7101 of light guide plate 710 and facing towards the collimating optical component 712.

In some exemplary embodiments, a refractive index of the light guide plate 710 is greater than a short-axis refractive index of the liquid crystal, so that the light in the light guide plate 710 easily propagates by total reflection in the light guide plate 710. The light emergent surface 7101 and the bottom surface 7102 of the light guide plate 710 are parallel so as not to change the incident angle of the light incident from the light guide plate 710 to the liquid crystal layer 103.

In some exemplary embodiments, the light source 711 may be a monochromatic light source. As an example, the light source 711 may be a monochrome LED light source, such as a micro-LED, a monochrome OLED light source, such as a micro-OLED light source, or a monochrome laser source. Selecting a monochromatic light source as the light source in some embodiments of the present disclosure may facilitate the diffraction of light of a specific wavelength by the diffractive optical element 104.

In some embodiments of the present disclosure, the collimating optical element 712 may collimate the light emitted from the light source 711 so that the light is incident into the light guide plate 710 vertically. In an exemplary embodiment, the collimating optical element 712 may include a collimating lens or a free-form curved surface mirror.

In some embodiments of the present disclosure, the coupling grating 713 is configured to modulate the propagation angle of the beam collimated by the collimating optical element 712 to couple the collimated beam into the light guide plate 710, such that the collimated light may propagate by total internal reflection in the light guide plate 710. In some exemplary embodiments, the coupling grating 713 may include any of a tilted grating, a holographic Bragg grating, and a step grating.

In order to facilitate the explanation of the present disclosure, a Cartesian coordinate system may be constructed in which a Z axis is perpendicular to a surface of the liquid crystal cell, the X axis and the Y axis are parallel to the surface of the liquid crystal cell and the two are perpendicular to each other, and an origin O may at any position.

Figure 2:
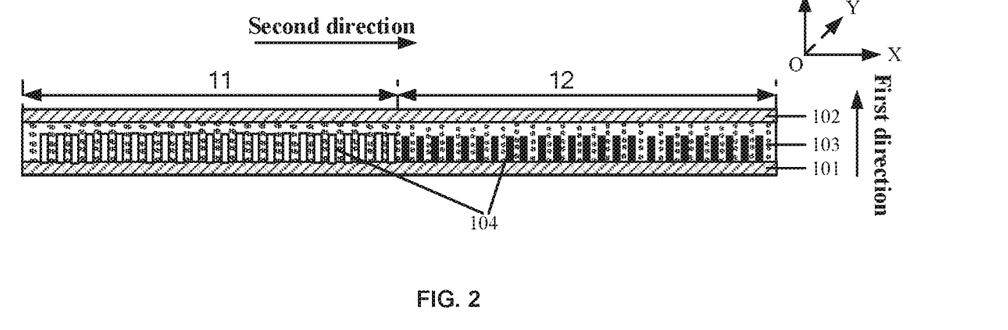
FIG. 2 is a schematic view of an exemplary liquid crystal cell in some embodiments of the present disclosure.

FIG. 2 is a schematic view of an example liquid crystal cell in some embodiments of the present disclosure. As shown in FIG. 2, the liquid crystal cell 72 includes a first electrode 101, a second electrode 102 disposed in a first direction (Z direction) opposite to the first electrode 101, a liquid crystal layer 103 between the first electrode 101 and the second electrode 102, and a diffractive optical element 104 in the liquid crystal layer 103.

In some exemplary embodiments of the present disclosure, a refractive index of the diffractive optical element 104 is equal to a short-axis refractive index of the liquid crystal in the liquid crystal layer 103. The liquid crystal cell is divided into a first portion 11 and a second portion 12 in a second direction (X direction) perpendicular to the first direction (Z direction). In the first portion 11, the liquid crystal molecules are capable of rotating in a first plane, and in the second portion 12, the liquid crystal molecules are capable of rotating in a second plane perpendicular to the first plane.

Figure 3:
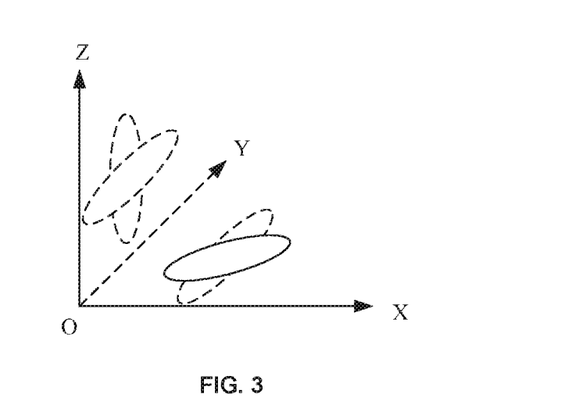
FIG. 3 illustrates a schematic view of rotation of liquid crystal molecules of a first portion and liquid crystal molecules of a second portion in planes perpendicular to each other in some embodiments of the present disclosure.

FIG. 3 is a schematic view showing rotation of liquid crystal molecules of a first portion and liquid crystal molecules of a second portion in planes perpendicular to each other according to some embodiments of the present disclosure. As shown in FIG. 3, the XOZ plane may represent the first plane, and the liquid crystal molecules of the first portion may rotate in the XOZ plane. The YOZ plane may represent the second plane, and the liquid crystal molecules of the second portion may rotate in the YOZ plane.

In some exemplary embodiments of the present disclosure, the liquid crystal molecules of the first portion 11 may be rotated in the XOZ plane by applying a voltage difference between the first electrode 101 and the second electrode 102 of the first portion 11. The liquid crystal molecules of the second portion 12 may be rotated in the XOZ plane by applying a voltage difference between the first electrode 101 and the second electrode 102 of the second portion 12.

It should be noted that, in some embodiments of the present disclosure, regarding the configuration of the first electrode and the second electrode, any conventional configuration capable of controlling the rotation of liquid crystal molecules used in a conventional display device may be adopted. As an example, the first electrode may be a common electrode, which may be a planar electrode, and the second electrode may be a pixel electrode, which may include a plurality of strip electrodes arranged in parallel in the X direction, or a bulk electrode arranged in an array in the XOY plane.

In some embodiments of the present disclosure, the liquid crystal layer may include a positive liquid crystal having a short-axis refractive index $n_o$ and a long-axis refractive index $n_e$. In an alternative embodiment, the difference between the long-axis refractive index $n_e$ and the short-axis refractive index $n_o$ of the liquid crystal is between 1.522 and 1.822. That is, $1.522 \leq n_e - n_o \leq 1.822$. Selecting a liquid crystal with such parameters is conducive to improve the display effect.

In some embodiments of the present disclosure, the diffractive optical element may include a multi-step grating, such as two-step, four-step, eight-step. The gaps in the multi-step grating may be filled by the liquid crystal in the liquid crystal layer.

A step grating is a diffraction grating with a lower density of reticles the shape of which is for a high incidence angle, that is, a high diffraction order. Step gratings may be classified into large step gratings, medium step gratings, and small step gratings. Generally speaking, gratings with less than 10 lines per millimeter are large step gratings, gratings with 10 to 400 lines per millimeter are medium step gratings, and gratings with more than 400 lines per millimeter are small step gratings.

As a diffractive optical element, the step grating may effectively improve the diffraction efficiency. In addition, the step grating may be designed to have a small thickness, for example, on the order of nanometers. Therefore, using the step grating as the diffractive optical element may greatly reduce the thickness of the liquid crystal cell, thereby reducing the thickness of the display device.

Figure 4:
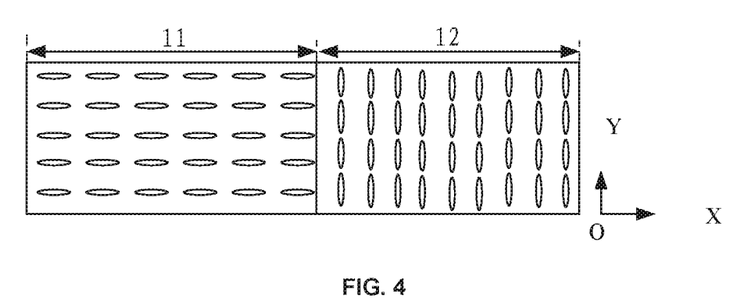
FIG. 4 illustrates exemplary initial orientations of liquid crystal molecules of a first portion in a liquid crystal layer and liquid crystal molecules of a second portion in a liquid crystal layer in some embodiments of the present disclosure.

FIG. 4 illustrates exemplary initial orientations of liquid crystal molecules of the first portion in a liquid crystal layer and liquid crystal molecules of the second portion in a liquid crystal layer in some embodiments of the present disclosure. As shown in FIG. 4, the liquid crystal molecules of the first portion and the liquid crystal molecules of the second part are arranged parallel to the XOY plane, wherein the liquid crystal molecules of the first portion in the liquid crystal layer may have an initial orientation parallel to the X axis, and the liquid crystal molecules of the second portion in the liquid crystal layer may have an initial orientation parallel to the Y axis. This initial orientation configuration can facilitate the control of the deflection angle or the deflection direction of the liquid crystal molecules of the first and second portions in the liquid crystal layer, so as to further control the polarization of light emergent from the first and second portions of the liquid crystal layer, respectively, thereby realizing gray-scale modulation of the display device.

Figure 5:
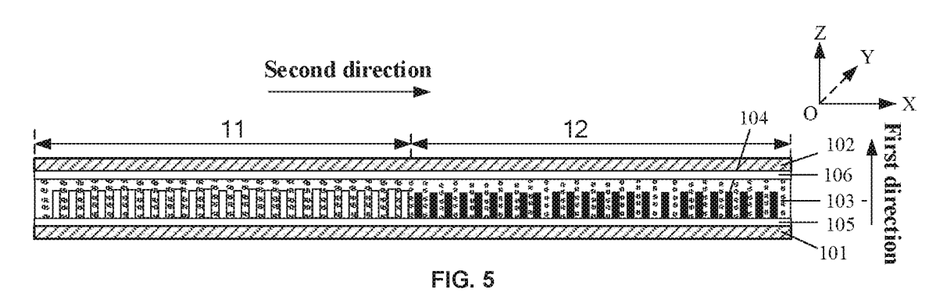
FIG. 5 is a schematic diagram of another example liquid crystal cell in some embodiments of the present disclosure.

FIG. 5 is a schematic view of another example liquid crystal cell in some embodiments of the present disclosure. As shown in FIG. 5, in addition to the components shown in FIG. 2, the liquid crystal cell may further include a first alignment layer 105 on a side of the first electrode 101 facing towards the liquid crystal layer 103, and a second alignment layer 106 on a side of the second electrode 102 facing towards the liquid crystal layer 103. An orientation of the first alignment layer 105 is perpendicular to an orientation of the second alignment layer 106. In some embodiments of the present disclosure, the liquid crystal molecules may be initially aligned through the alignment layers, so that the liquid crystal molecules of the first portion 11 and the liquid crystal molecules of the second portion 12 may have the initial orientations respectively as shown in FIG. 4.

In other embodiments, the liquid crystal molecules in the liquid crystal layer may be initially aligned by other techniques, such as light induced alignment.

Figure 6A:
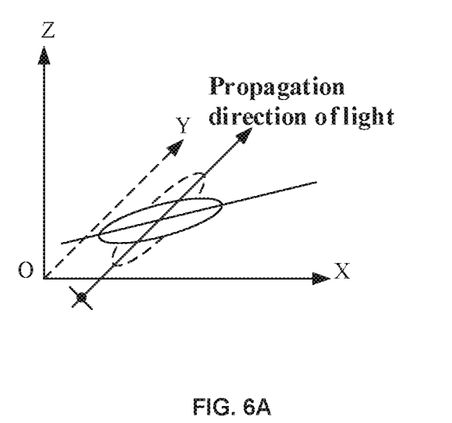
FIGS. 6A and 6B illustrate liquid crystal molecules of a first portion rotated in the XOZ plane and liquid crystal molecules of a second portion rotated in the YOZ plane, respectively.
Figure 6B:
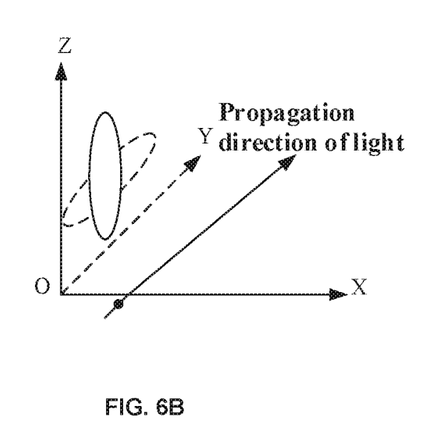
Figure 7:
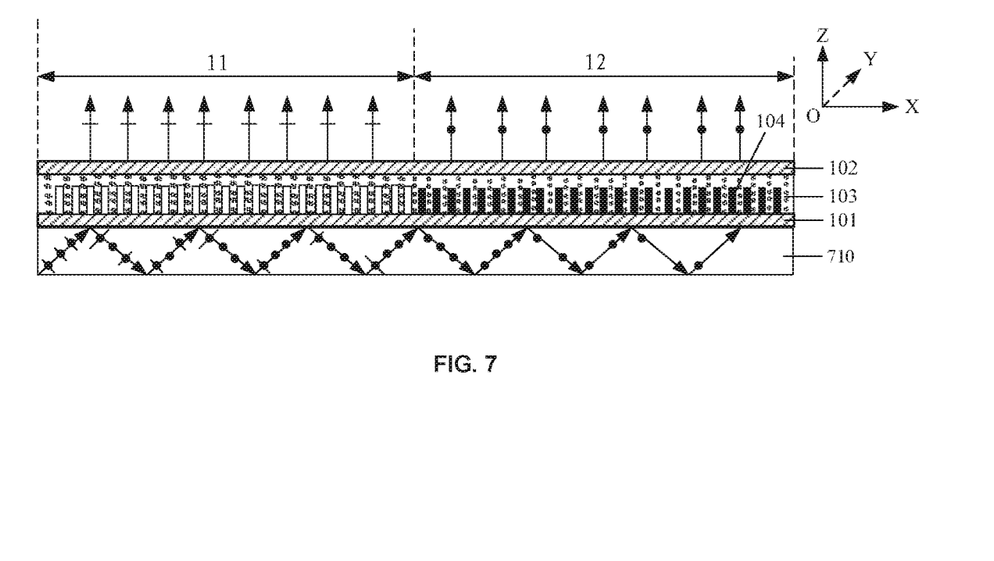
FIG. 7 illustrates an effect of a liquid crystal cell on light in an operation state in some embodiments of the present disclosure.

FIGS. 6A and 6B illustrate liquid crystal molecules of a first portion rotated in the XOZ plane and liquid crystal molecules of a second portion rotated in the YOZ plane, respectively. FIG. 7 illustrates the effect of the liquid crystal cell of the display device on light in the operating state in some embodiments of the present disclosure. In FIGS. 6A, 6B, and 7, solid dots indicate polarized component whose vibration direction is perpendicular to the XOZ plane, and short lines indicate polarized component whose vibration direction is parallel to the XOZ plane.

The following describes in detail the effect of the liquid crystal cell on light in operating state to achieve the gray-scale display of the display panel in conjunction with FIG. 6A, FIG. 6B, and FIG. 7.

In some embodiments of the present disclosure, by selecting an appropriate refractive index of the light guide plate 710 and configuration parameters of the coupling grating 713, it is possible that, in the case where the liquid crystal exhibits a short-axis refractive index for light incident therein, the light from the light source 711 after coupled through the coupling grating 713 may propagate by total reflection in the X direction in the light guide plate 710.

1) Explanation of the Effect of the First Portion of the Liquid Crystal Cell on Light As shown in FIG. 6A, the liquid crystal molecules of the first portion 11 may be rotated in the XOZ plane by the electric field between the first electrode 101 and the second electrode 102. When the light in the light guide plate 710 is incident on the liquid crystal layer 103 at the first portion 11 of the liquid crystal cell 72, the angle in the XOZ plane between the long axis of the liquid crystal molecules of the first portion and the propagation direction of the light incident on the liquid crystal layer 103 from the light guide plate 710 is constantly changing. On the one hand, when the liquid crystal molecules of the first portion 11 are rotated such that the long axis is parallel to the propagation direction of light from the light guide plate 710 toward the liquid crystal layer 103, light does not undergo birefringence in the liquid crystal layer 103. In this case, the refractive index of the liquid crystal layer 103 for light incident on the liquid crystal layer is equal to the short-axis refractive index of the liquid crystal, and is also equal to the refractive index of the diffractive optical element 104. That is, for the light incident from the light guide plate 710 to the liquid crystal layer 103, the liquid crystal in the liquid crystal layer 103 and the diffractive optical element 104 together constitute a uniform medium with a refractive index $n_o$. In the case where the incident angle of light incident from the light guide plate 710 toward the liquid crystal layer 103 is equal to or greater than the total reflection critical angle, light will not enter the liquid crystal layer 103 from the light guide plate 710 or be diffracted by the diffractive optical element 104, but be confined within the light guide plate 710. In this case, the display device exhibits a dark state.

On the other hand, when the liquid crystal molecules of the first portion 11 are rotated such that there is an angle between the long axis and the propagation direction of light from the light guide plate 710 toward the liquid crystal layer 103, the light may enter the liquid crystal layer 103 from the light guide plate 710 and will undergo a birefringence phenomenon, generating a first polarized component whose vibration direction is parallel to the XOZ plane (represented as e-light in the liquid crystal layer of the first portion 11) and a second polarized component whose vibration direction is perpendicular to the XOZ plane (represented as o-light in the liquid crystal layer of the first portion 11). In this case, the liquid crystal has a short-axis refractive index $n_o$ for the second polarized component and a refractive index that changes with the rotation angle of the liquid crystal molecules for the first polarized component. When the liquid crystal is deflected such that the propagation direction of light from the light guide plate 710 toward the liquid crystal layer 103 is perpendicular to the long axis of the liquid crystal, the refractive index of the liquid crystal for the first polarized component is the largest, which is equal to the long axis refractive index $n_e$ of the liquid crystal. Since the short-axis refractive index $n_o$ of the liquid crystal is equal to the refractive index of the diffractive optical element, for the second polarized component (o light in the liquid crystal layer of the first portion 11), the liquid crystal in the liquid crystal layer 103 and the diffractive optical element 104 together form a uniform medium with a refractive index of $n_o$. Therefore, the second polarized component may not be diffracted out of the light guide plate 710 by the diffractive optical element 104 in the liquid crystal layer 103, but continues to propagate in the light guide plate 710 by total reflection. However, for the first polarized component (e-light in the liquid crystal layer of the first portion 11), the refractive index of the liquid crystal in the liquid crystal layer 103 for the first polarized component is greater than the refractive index of the diffractive optical element 104. The diffractive optical element 104 and the liquid crystal form a non-uniform medium. Therefore, the diffractive optical element 104 may diffract the first polarized component out of the light guide plate 710, and thus the diffracted first polarized component may exit the liquid crystal layer 103 (as shown in FIG. 7). Since the refractive index of the liquid crystal for the first polarized component changes with the angle between the long axis of the liquid crystal molecules and the propagation direction of light from the light guide plate 710 toward the liquid crystal layer 103, the diffraction efficiency of the diffractive optical element 104 for the first polarized component also changes with the rotation angle of the liquid crystal molecules. When the long axis of the liquid crystal molecules is parallel to the light propagation direction, the diffraction efficiency of the first polarized component is the lowest, which is almost 0. When the long axis of the liquid crystal molecules is perpendicular to the propagation direction of the light from the light guide plate 710 toward the liquid crystal layer 103, the diffraction efficiency for the first polarized component is the highest.

It can be seen that during the liquid crystal molecules of the first portion 11 rotating in the XOZ plane, when the liquid crystal molecules are rotated such that the optical axis thereof is parallel to the light propagation direction, no light is diffracted out of the light guide plate 710 by the diffractive optical element 104; when there is an angle (not equal to 0) between the optical axis of the liquid crystal molecules and the propagation direction of light that is constantly changing, the second polarized component that vibrates perpendicular to the XOZ plane may not be diffracted out of the light guide plate 710, while the first polarized component that vibrates parallel to the XOZ plane may be diffracted out of the light guide plate 710 by the diffractive optical element 104 and enter the liquid crystal layer 103 (as shown in FIG. 7), wherein the diffraction efficiency changes with the angle between the optical axis of liquid crystal molecules and the propagation direction of light. Therefore, during the liquid crystal molecules rotating in the XOZ plane under the action of the electric field, the liquid crystal in the liquid crystal layer 103 and the diffractive optical element 104 together constitute a gray-scale modulation structure. By controlling the rotation angle of the liquid crystal molecules, the gray-scale modulation structure may control the amount of light exiting from the liquid crystal layer 103 of the first portion, and therefore, the gray-scale display of the display device may be realized.

In addition, as described above, for the first portion 11 of the liquid crystal cell, the second polarized component vibrating perpendicular to the XOZ plane may not be diffracted, and therefore may not exit from the liquid crystal layer 103; the first polarized component that vibrating parallel to the XOZ plane may be diffracted out of the light guide plate 710 and enter the liquid crystal, so it may exit from the liquid crystal layer 103. As light propagates in the area of the light guide plate corresponding to the first portion 11, more and more first polarized components are diffracted out of the light guide plate 710. If a suitable length of the first portion 11 and the structure of the diffractive optical element are provided, in some embodiments, all the first polarized component vibrating parallel to the XOZ plane may be diffracted out of the light guide plate 710 at the first portion 11, and in the area of the light guide plate corresponding to the second portion 12, only the second polarized component vibrating perpendicular to the XOZ plane is transmitted, as shown in FIG. 7.

2) Explanation of the Effect of the Second Portion of the Liquid Crystal Cell on Light As shown in FIG. 6B, the liquid crystal molecules of the second portion 12 may be rotated in the YOZ plane. When the liquid crystal molecules are rotated such that the long axis is parallel to the Z axis, since the vibration direction of the second polarized component is perpendicular to the main plane (a plane formed by the propagation direction of light and the long axis of the liquid crystal, that is, the XOZ plane) of the second polarized component, the liquid crystal has a short-axis refractive index $n_o$ for the second polarized light, which is equal to the refractive index of the diffractive optical element. In this case, the liquid crystal in the liquid crystal layer 103 and the diffractive optical element 104 together form a homogeneous medium with a refractive index $n_o$, so the second polarized light may not be diffracted by the diffractive optical element 104. Since there is no first polarized component in the second portion 12, no light is diffracted out of the light guide plate 710 in this case. In this case, the display device exhibits a dark state.

When the liquid crystal molecules are rotated in the YOZ plane such that their long axis direction has an angle with the Z axis, the vibration direction of the second polarized component is no longer perpendicular to its main plane. Therefore, the refractive index of the second polarized component of the liquid crystal is not equal to the short-axis refractive index of the liquid crystal and the refractive index of the diffractive optical element 104, but changes with the rotation angle of the long-axis of the liquid crystal. In this case, the liquid crystal in the liquid crystal layer 103 and the diffractive optical element 104 form a non-uniform medium for the second polarized component. Therefore, the second polarized light component may be diffracted out of the light guide plate 710 by the diffractive optical element 104 and enter the liquid crystal, and the diffraction efficiency of diffractive optical element 104 for the second polarized component changes with the change of rotation angle of the liquid crystal molecules. Therefore, during the liquid crystal molecules rotating in the YOZ plane under the action of the electric field, the liquid crystal in the liquid crystal layer 103 and the diffractive optical element 104 together constitute a gray-scale modulation structure. By controlling the rotation angle of the liquid crystal molecules, the gray-scale modulation structure may control the amount of light exiting from the liquid crystal layer 103 of the second portion 12, and therefore, the display gray-scale modulation of the display device may be realized in the second portion 12.

It can be seen that no matter whether the first portion 11 or the portion part 12, a dark state in which no light is diffracted and a gray scale display state in which the diffraction efficiency changes with the rotation of the liquid crystal molecules may be achieved during the rotation of the liquid crystal molecules. Therefore, the display device provided by some embodiments of the present disclosure may realize normal grayscale display without using a polarizer. In addition, in the first portion 11, the first polarized component polarized parallel to the XOZ plane may be completely diffracted out and in the second portion 12, the second polarized component that is not diffracted out in the first portion and polarized perpendicular to the XOZ plane is diffracted out. Therefore, both polarized components may be diffracted out of the light guide plate, enter the liquid crystal layer and interact with the liquid crystal in the liquid crystal layer, and then exit the liquid crystal layer for use by other components located above the liquid crystal layer. It can be seen that both types of polarized components from the light source may be used for display, thereby improving the light utilization efficiency of the display device.

In some embodiments of the present disclosure, the display device may further include a control element 74 configured to control the electric field between the first electrode 101 and the second electrode 102 of the first portion 11 so as to rotate in the first plane the liquid crystal molecules of the first portion 11, so that the diffractive optical element 104 diffracts a first polarized component of light propagating through the light guide plate 710 of the backlight module 71 out of the light guide plate 710, wherein the polarization direction of the first polarized component is parallel to the first plane, and to control the electric field between the first electrode 101 and the second electrode 102 of the second portion 11 so as to rotate in the second plane the liquid crystal molecules of the second portion 11, so that the diffractive optical element 104 diffracts a second polarized component of light propagating through the light guide plate 710 of the backlight module 71 out of the light guide plate 710, wherein the polarization direction of the second polarized component is parallel to the second plane.

In exemplary embodiments, the display device may further include a color filter layer 73 on a side of the second electrode 102 of the liquid crystal cell 72 away from the liquid crystal layer 103. The color filter layer 73 may include quantum dots. As an example, with this configuration, the light coupled out from the liquid crystal layer 103 may excite the quantum dots to emit light of different colors, so that color display may be realized.

The elements or modules (for example the control element) described herein may be implemented as a combination of a processor and a memory, wherein the processor executes a program stored in the memory to implement the functionality of the corresponding elements or modules. The elements or modules described herein may also be completely implemented by hardware, including but not limited to Application Specific Integrated Circuits (ASICs), Field Programmable Gate Arrays (FPGAs).

In yet another aspect of the present disclosure, a method for controlling a display device is further provided. Alternatively, the method may be used for a display device according to one or more embodiments disclosed in detail above. Thus, for optional embodiments of the method, reference might be made to the embodiments of the detector. The method includes the following steps, which may be performed in the given order or in a different order. Further, additional method steps might be provided which are not listed. Further, two or more or even all of the method steps might be performed at least partially simultaneously. Further, a method step might be performed twice or even more than twice, repeatedly.

Figure 8:
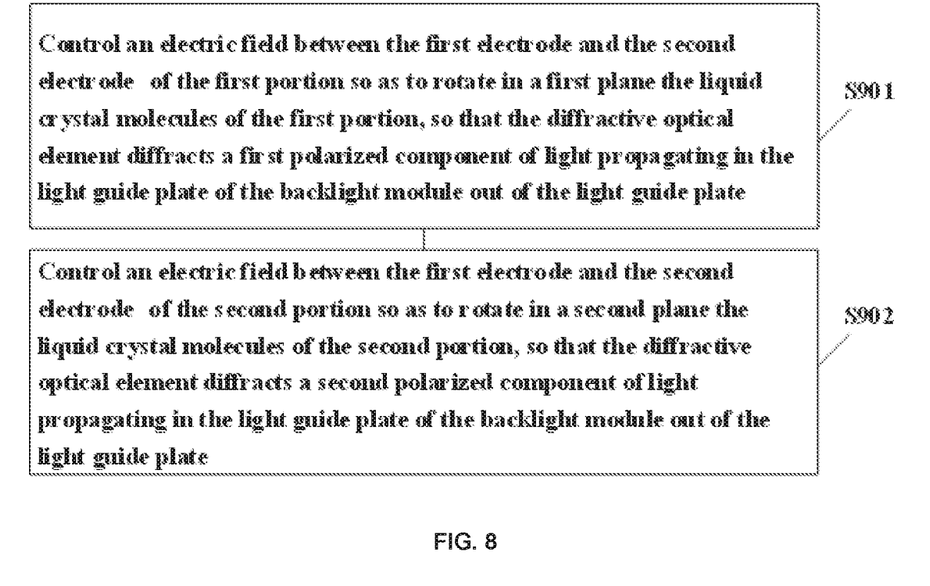
FIG. 8 is a flowchart of an exemplary method for controlling a display device in some embodiments of the present disclosure.

FIG. 8 is a flowchart of some example method for controlling a display device in some embodiments of the present disclosure. As shown in FIG. 8, the method includes steps S901 and S902.

In step S901, the voltage between the first electrode and the second electrode of the first portion may be controlled so as to rotate in the first plane the liquid crystal molecules of the first portion, so that the diffractive optical element diffracts a first polarized component of the light propagating in the light guide plate of the backlight module out of the light guide plate. In some embodiments of the present disclosure, the polarization direction of the first polarized component is parallel to the first plane.

In step S902, are rotated the voltage between the first electrode and the second electrode of the second portion may be controlled so as to rotate in the second plane the liquid crystal molecules of the second portion, so that the diffractive optical element diffracts the second polarized component of the light propagating in the light guide plate of the backlight module out of the light guide plate. In some embodiments of the present disclosure, the polarization direction of the second polarized component is parallel to the second plane.

The foregoing description of the embodiment has been provided for purpose of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are included within the scope of the disclosure.

What is claimed is:

1. A display device comprising a backlight module and a liquid crystal cell located on a light emitting side of the backlight module, the liquid crystal cell comprising:
    a first electrode;
    a second electrode disposed in a first direction opposite to the first electrode;
    a liquid crystal layer between the first electrode and the second electrode; and
    a diffractive optical element in the liquid crystal layer, wherein a refractive index of the diffractive optical element is equal to a short-axis refractive index of a liquid crystal in the liquid crystal layer, and
    wherein the liquid crystal cell is divided into a first portion and a second portion in a second direction perpendicular to the first direction, wherein liquid crystal molecules of the first portion are capable of rotating in a first plane, and wherein liquid crystal molecules of the second portion are capable of rotating in a second plane perpendicular to the first plane.

2. The display device according to claim 1, wherein the liquid crystal molecules of the first portion have a first initial orientation, wherein the liquid crystal molecules of the second portion have a second initial orientation, and wherein the first initial orientation and the second initial orientation are perpendicular to each other and both parallel to a third plane perpendicular to the first and second planes.

3. The display device according to claim 2, further comprising a first alignment layer on a side of the first electrode facing towards the liquid crystal layer and a second alignment layer on a side of the second electrode facing towards the liquid crystal layer, wherein an orientation of the first alignment layer is perpendicular to an orientation of the second alignment layer.

4. The display device according to claim 1, wherein the liquid crystal layer comprises a positive liquid crystal.

5. The display device according to claim 4, wherein a difference between a long-axis refractive index and a short-axis refractive index of the liquid crystal in the liquid crystal layer is between 1.522 and 1.822.

6. The display device according to claim 1, wherein the diffractive optical element comprises a multi-step grating.

7. The display device according to claim 1, wherein the backlight module comprises:
    a light guide plate having a light emergent surface and a bottom surface opposite to the light emergent surface;
    a light source located at an end of the light guide plate and on a side of the bottom surface of the light guide plate;
    a collimating optical component located between the bottom surface of the light guide plate and the light source; and
    a coupling grating located on the light emergent surface of the light guide plate and facing towards the collimating optical component.

8. The display device according to claim 7, wherein the light source comprises at least one of a monochrome LED light source, a monochrome OLED light source, or a monochrome laser light source.

9. The display device according to claim 7, wherein the collimating optical element comprises at least one of a collimating lens or a free-form curved mirror.

10. The display device according to claim 7, wherein the coupling grating comprises at least one of a tilted grating, a holographic Bragg grating, or a step grating.

11. The display device according to claim 1, further comprising a color filter layer on a side of the second electrode away from the liquid crystal layer.

12. The display device according to claim 11, wherein the color filter layer comprises a quantum dot.

13. The display device according to claim 1, further comprising a control element configured to:
    control an electric field between the first electrode and the second electrode of the first portion so as to rotate in a first plane the liquid crystal molecules of the first portion, so that the diffractive optical element diffracts a first polarized component of light propagating in the light guide plate of the backlight module out of the light guide plate, wherein a polarization direction of the first polarized component is parallel to the first plane; and
    control the electric field between the first electrode and the second electrode of the second portion so as to rotate in a second plane the liquid crystal molecules of the second portion, so that the diffractive optical element diffracts a second polarized component of light propagating in the light guide plate of the backlight module out of the light guide plate, wherein a polarization direction of the second polarized component is parallel to the second plane.

14. The display device according to claim 13, wherein the diffractive optical element is configured such that, in a case where the first polarized component is diffracted out of the light guide plate, a portion of the light guide plate corresponding to the second portion transmits only the second polarized component.

15. A method for controlling a display device according to claim 1, the method comprising:
    controlling an electric field between the first electrode and the second electrodes in the first portion so as to rotate in a first plane the liquid crystal molecules in the first portion, so that the diffractive optical element diffracts a first polarized component of light propagating through the light guide plate of the backlight module out of the light guide plate, wherein a polarization direction of the first polarized component is parallel to the first plane; and
    controlling an electric field between the first electrode and the second electrodes of the second portion so as to rotate in the second plane the liquid crystal molecules of the second portion, so that the diffractive optical element diffracts a second polarized component of light propagating through the light guide plate of the backlight module out of the light guide plate, wherein a polarization direction of the second polarized component is parallel to the second plane.

16. The method according to claim 15, further comprising:
    transmitting only the second polarized component by a portion of the light guide plate corresponding to the second portion, in a case where the first polarized component is diffracted out of the light guide plate.

17. The method according to claim 15, wherein the liquid crystal molecules of the first portion have a first initial orientation, and the liquid crystal molecules of the second portion have a second initial orientation, and wherein the first initial orientation and the second initial orientation are perpendicular to each other and both parallel to a third plane perpendicular to the first and second planes.

18. The method according to claim 17, further comprising a first alignment layer on a side of the first electrode facing towards the liquid crystal layer and a second alignment layer on a side of the second electrode facing towards the liquid crystal layer, wherein an orientation of the first alignment layer is perpendicular to an orientation of the second alignment layer.

19. The method according to claim 15, wherein the liquid crystal layer comprises a positive liquid crystal.

20. The method according to claim 19, wherein a difference between a long-axis refractive index and a short-axis refractive index of the liquid crystal in the liquid crystal layer is between 1.522 and 1.822.

* * * * *